United States Patent [19]

Limisaque et al.

[11] Patent Number: 4,851,653
[45] Date of Patent: Jul. 25, 1989

[54] INTEGRATED CIRCUIT FOR MEMORIZING AND PROCESSING INFORMATION CONFIDENTIALLY, INCLUDING AN ANTI-FRAUD DEVICE

[75] Inventors: Gilles Limisaque, Peynier; Laurent Sourgen, Aix en Provence, both of France

[73] Assignee: Thomson Composants Militaires & Spaciaux, Paris, France

[21] Appl. No.: 117,510

[22] Filed: Nov. 6, 1987

[30] Foreign Application Priority Data

Nov. 7, 1986 [FR] France ................. 86 15577

[51] Int. Cl.$^4$ ................ G06F 15/21; G06K 5/00
[52] U.S. Cl. .................... 235/492; 235/380; 902/26; 340/825.31
[58] Field of Search ............ 340/825.31, 825.32, 340/825.33, 825.34; 235/492, 382, 382.5, 380, 488, 487, 375; 902/5, 26, 38; 307/590, 592, 594, 605

[56] References Cited

U.S. PATENT DOCUMENTS

| | | | |
|---|---|---|---|
| 3,953,769 | 4/1976 | Sopko | 340/825.31 |
| 4,004,163 | 1/1977 | Spence | 307/605 |
| 4,211,919 | 7/1980 | Ugon | 235/487 |
| 4,366,400 | 12/1982 | Kirsch | 307/594 |
| 4,375,032 | 2/1983 | Uchida | 235/380 |
| 4,477,806 | 10/1984 | Mochida et al. | 340/825.32 |
| 4,484,067 | 11/1984 | Obrecht | 235/382 |
| 4,641,049 | 2/1987 | Fukuzo | 307/590 |
| 4,646,080 | 2/1987 | Genest et al. | 340/825.31 |
| 4,661,991 | 4/1987 | Logemann | 340/825.31 |
| 4,698,529 | 10/1987 | Asami | 307/592 |
| 4,746,822 | 5/1988 | Mahoney | 307/594 |

FOREIGN PATENT DOCUMENTS 0113590 7/1984 European Pat. Off. .
0145405 6/1985 European Pat. Off. .
2311360 12/1976 France .
2088605 6/1982 United Kingdom .

Primary Examiner—Alan Faber
Assistant Examiner—Robert A. Weinhardt
Attorney, Agent, or Firm—Oblon, Spivak, McClelland, Maier & Neustadt

[57] ABSTRACT

An integrated circuit for memorizing and processing information confidentially, which includes a device for controlling access to its own functions, intended to receive a confidential code, and a time delay circuit imparting a minimum predetermined delay between two attempts at introducing a confidential code even in the event of a power cut of the circuit between attempts.

5 Claims, 1 Drawing Sheet

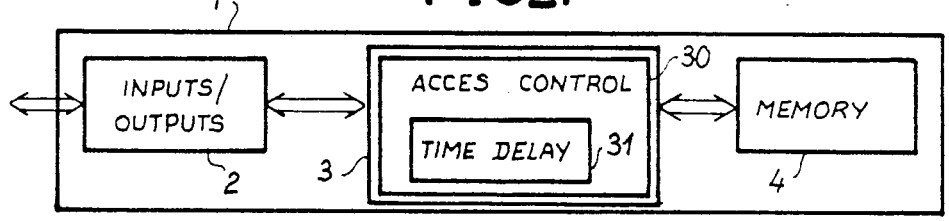
FIG_1
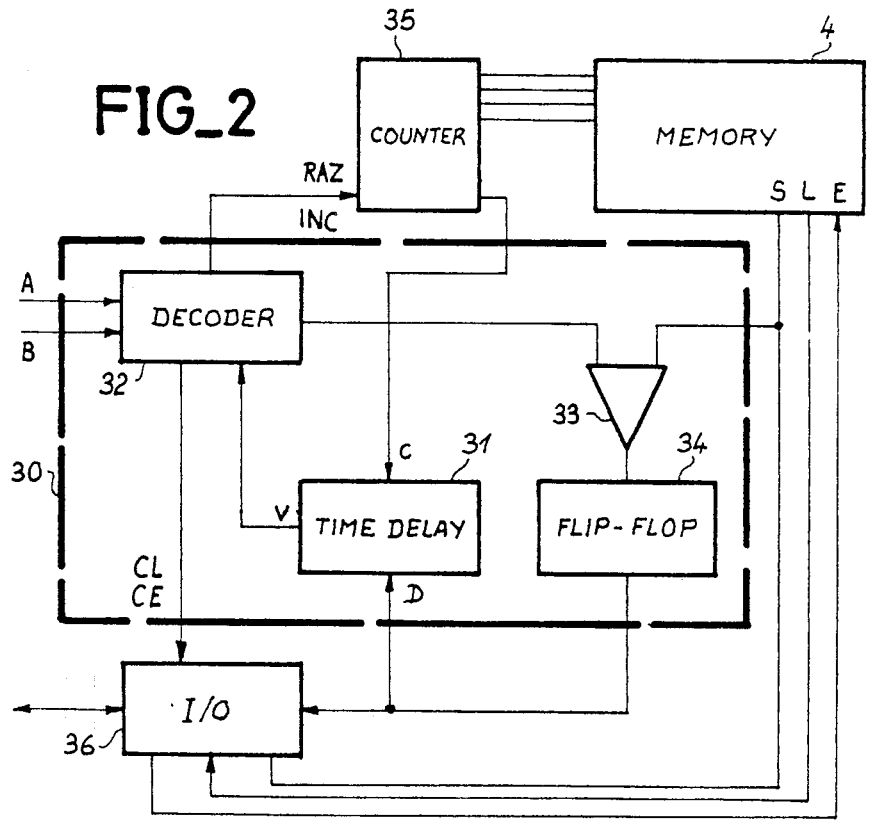
FIG_2
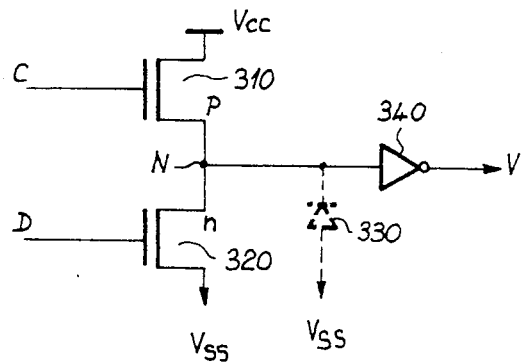
FIG_3

INTEGRATED CIRCUIT FOR MEMORIZING AND PROCESSING INFORMATION CONFIDENTIALLY, INCLUDING AN ANTI-FRAUD DEVICE

BACKGROUND OF THE INVENTION

1. Field of the Invention

The present invention relates to an integrated circuit for memorizing and storing information confidentially, including an anti-fraud device. It relates more particularly, but not exclusively, to integrated circuits of the above type known as memory cards.

2. Description of the Prior Art

Memory cards are formed with an integrated electronic circuit including essentially an electrically programmable non volatile memory often having non modifiable confidential data, input/output means for coupling the circuit to a data transfer device and processing means interconnected between the input/output means and the memory. In some applications of the memory cards, it is essential to protect the access to certain zones of the non volatile memory by an access key such as a confidential code associated with certain rights of reading or writing in the specific zones. There exist numerous devices for dissauding defrauders who seek to discover the secret code or the access key to a memory by successive attempts.

Among these devices, the most widely known is doubtless the one which permanently memorizes the key presentation errors and blocks operation of the circuit as soon as the number of errors exceeds a predetermined value. with such devices there is generally associated a logic which prevents the insertion of a correct key from being monitored by observing variations of the supply currents of a circuit. The defrauder cannot therefore be informed of the results of the attempts he has undertaken.

Now, such devices require a relatively large space in the memory for recording the correct attempts which are in fact the most frequent. In the case where the card has relatively simple functions, such complex processing which requires a great deal of space on the component, cannot be justified. There is then hesitation in using such an antifraud device. Moreover, it is required in certain applications, on the contrary, to reinforce the antifraud detection device.

SUMMARY OF THE INVENTION

The device of the invention provides a simple solution to these problems, since, in the case of simple applications of the cards, it can be substituted for the devices of the prior art, or be combined with such devices in the case of more complex applications.

The present invention provides then an integrated circuit for memorizing and processing information confidentially, including means for controlling the access to the functions of said circuit by the introduction of a confidential code, wherein these control means include a timing device imparting a minimum predetermined delay between two attempts at introducing a conventional code.

The present invention also provides an integrated circuit including at least:

an electrically programmable non volatile memory containing, among other things, enabling data;

input/output means for coupling the circuit to a data transfer device;

processing means interconnected between the input/output means and the non volatile memory, said means including access control means in which a comparator is adapted for comparing the enabling data with a confidential code introduced via the input/output means, wherein said control means include the timing device and said device is adapted to cause locking of the input/output means during the minimum predetermined delay between two attempts at introducing a confidential code even in the case of cuts in the supply voltage of the circuit between attempts.

In the definition of the present invention, the following points will be stated clearly for a man skilled in the art:

by information processing is meant either the simple transfer of data between the integrated circuit and an external system, or the transfer and execution of a certain number of operations inside the circuit itself.

By comparator is meant not only a simple comparator effecting the comparison between the enabling data and the confidential code or access key, but also any system which, from the enabling data or the confidential code or the access key, carries out a certain number of operations for authorizing the continuation of the operations.

By processing means is meant all the circuits required for writing and reading data into and from the memory as well as for the processing of this data and for controlling access to the functions of the integrated circuit. Generally, the processing means are formed by a microprocessor with its auxiliary circuits well known to a man skilled in the art.

BRIEF DESRIPTION OF THE DRAWINGS

Other features and advantages of the invention will be clear from reading the following description with reference to the accompanying drawings which are given solely by way of nonlimitative example and in which:

FIG. 1 shows the diagram of the integrated circuit of the present invention,

FIG. 2 shows one embodiment of the circuit of FIG. 1, and

FIG. 3 shows one embodiment of the timing circuit shown in FIG. 2.

DESCRIPTION OF THE PREFERRED EMBODIMENT

In FIG. 1 has been shown by way of example a memory card 1 using an integrated circuit incorporating the present invention.

The memory card shown in FIG. 1 includes essentially an input/output device 2 for coupling the card to an external data transfer device; the processing means 3 having, among other things, a device 30 for controlling access to the functions of the card; an electrically programmable non volatile memory 4. The processing means 3 are interconnected between the input/output device 2 and memory 4. The access control device 30 includes a timing device 31 which allows a predetermined minimum delay to be imparted between two attempts at introducing a confidential code even if the supply voltage of the circuit is cut between these two attempts. The delay is chosen so that the probability of obtaining this code for a user who does not know it is substantially zero.

In FIG. 2 a particular example has been shown of the construction of a card in which the processing member 3 includes, among other things, a circuit for addressing the memory points. This circuit being formed by a counter 35. This member 30 also includes a logic circuit 36 for controlling reading and/or writing in memory 4. Circuit 36, on a logic order coming from the decoder, allows the bit addressed to be read from the memory or a data bit to be written into this memory at the scheduled address. The inputs and outputs I/O are connected to the transfer circuit so as to receive respectively data to be written or to transmit read data.

The access control member 30 includes a decoder for decoding the control signals A and B transmitted by the input/output device.

The control member also includes a comparator 33 connected to the decoder 32 and to the data output S of memory 4. The output of comparator 33 is connected to the input of a flip flop 34. The output of flip flop 34 is connected to an input of the timing circuit 31 and to an input of the logic reading/writing circuit 36. The timing circuit 31 is connected by another input to an output of counter 35 and is connected by its output to an input of the decoder 32.

Depending on whether signal A corresponds, for the decoder, to a 1 or 0 logic state, the decoder 32 either effects resetting RAZ of counter 35 or an incrementation INC of this counter.

Signal B corresponds to the confidential code introduced. The direction of the first bit of the confidential code, translated by a 0 or 1 logic state of signal A, triggers the counting. At each incrementation, the logic state of the outputs of the counter allows a bit of the enabling code to be addressed in the zone of the memory in which this enabling code has been stored. The decoder sends a logic order CL (or CE) which is translated by logic 36 into a reading order CL (CE being translated into a writing order).

The bit read at the address presented is transmitted to an input of a comparator 33 which receives at another input the corresponding bit of the confidential code coming from decoder 32. If the two bits are identical, the output of the comparator cannot modify the state of flip flop 34. The detection of the last bit of the confidential code by the counter 35 causes a logic state at one of its output (signal C) which triggers off the charging of the timing circuit 31. If no change of state has taken place in the flip flop for a given word, that is to say if the logic stae of the output of the flip flop has remained the same for each bit of the word, this state causes discharging (signal D) simultaneous with the charging.

When two bits present at the inputs of the comparator are different, the flip flop changes state. The change of state of its output prevents the discharging which would take place simultaneously with the charging in the timing circuit 31. Circuit 31 is consequently charged with detections of the last bit of the confidential code and will only be discharged after a predetermined time D. During the whole of this time, the decoder which receives the output signal V from the timing circuit is blocked by the state of this signal. Thus, during the whole of this time, d, no confidential code can be taken into account to be compared with the enabling code stored in the memory even if the supply voltage of the circuit is cut during time d.

In FIG. 3 a particualr embodiment has been shown of the timing circuit 31. This circuit includes advantageously two field effect transistors 310, 320 formed by CMOS or NMOS technology. The transistors are in series. Transistor 310 is connected to a voltage level $V_{CC}$ and transistor 320 is connected to a voltage level $V_{SS}$. A diode 330, whose cathode is connected to the junction point of the two transistors and whose anode is connected to the potential $V_{SS}$ allows the time delay to be introduced. The diode has been shown with broken lines for it is not a question of a specific component. The diode which exists intrinsically and which is formed for example by the junction between the drain of transistor 320 and the substrate allows the desired time delay to be obtained.

When the counter 35 reaches the value $2^n$ (that is 32 in an example of coding over 32 bits), whatever the succession of commands which have been represented at the input of decoder 32, the node N is charged by enabling the transistor 310 with voltage $V_{CC}$, the gate of this transistor having been activated by the signal C.

When the flip flop 34 has kept the same state, for example, a rest state, during the successive comparisons of each bit of the confidential code with each bit of the enabling code, the transistor 320 which is activated by the signal D, conducts. Node N is then discharged by conduction to $V_{SS}$ of transistor 320.

When the flip flop 30 has changed state during the comparison operation, the transistor 320 is not activated by signal D for this latter has not the required level and node N therefore remains charged.

The logic state of node N, when it is charged, allows the decoder 32 to be enabled via an inverting gate 340 which applies a signal V of the required logic level. Node N is then discharged by the leaks of diode 330 towards the substrate on which the transistors have been implanted. The discharge takes place during a time which depends on the technology of the components used, it may vary from 0.1 of a second to 1 second and is not influenced by a cut in the power supply to the circuit.

When the current flowing through the diode becomes sufficiently low, the node is discharged and the logic level at the input of the gate allows a signal V to be sent, via gate 340, adapted for unlocking the decoder 32.

The time delay obtained, which may then be of the order of 0.1 to 1 second, means, in the case where a code over 32 bits is used, that it will require 13 to 130 years to pass all the possible codes, namely 4,294,967,296 codes.

In the case where this time delay is 0.1 second (the most favorable case for a defrauder), the defrauder can only present 86,400 codes per day which represents one chance out of 49,710 of finding the correct code. It will then require 5 days of uninterrupted presentation to see this probability fall to one chance in 10,000.

It is obvious that a code over 64 bits makes even less likely the probability of discovering this code by a possible defrauder.

What is claimed is:

1. An integrated circuit for memorizing and processing information confidentially, comprising:
    an electrically programmable non-volatile memory containing, among other things, enabling data;
    input/output means for coupling the circuit to a data transfer device;
    processing means interconnected between the input/output means and the non-volatile memory, said processing means being provided with an n-bit address counter, a read/write control logic and an access control circuit;

said access control circuit including: a decoder circuit for decoding n-bit access codes introduced by way of the input/output means, said decoder circuit having a blocking input for inhibiting its operation; a comparator with two inputs connected respectively to an output of the decoder circuit and an output of the non-volatile memory to allow comparison of an n-bit access code stored in the memory and an n-bit code transmitted by the decoder circuit; said comparator having an output connected to the input of a flip-flop, the output of said flip-flop being connected to one input of a time-delay circuit for imparting a minimum predetermined delay between two attempts at introducing a confidential n-bit access code;

said time-delay circuit having a first and a second input and one output: said first input connected to an output of the n-bit address counter which outputs a charging signal upon reception of n bits at the decoder circuit, said second input connected to the output of the flip-flop, said output of the time-delay circuit being connected to the blocking input of the decoder circuit; said time-delay circuit outputting to the decoder circuit a blocking signal of a predetermined minimum duration corresponding to a delay necessary to discharge the time-delay circuit.

2. The integrated circuit as claimed in claim 1, wherein said blocking signal of predetermined minimum duration is sent even in the case of a power supply failure.

3. The integrated circuit as claimed in claim 1, wherein said time-delay circuit includes a first and a second field-effect transistor, connected in series between a first potential Vcc and second potential Vss, the drains of both transistors being connected together and to the cathode of a diode whose anode is connected to the second potential Vss, the gate of the first transistor being connected to the first input of the time-delay circuit, and the gate of the second transistor being connected to the second input of the time-delay circuit, the output of the time-delay circuit being connected to the common connection between the two transistors.

4. The integrated circuit as in claim 3, wherein the diode is formed by the junction existing between the drain of the second transistor and the substrate.

5. The integrated circuit as claimed in claim 2, wherein said time-delay circuit includes a first and a second field-effect transistor, connected in series between a first potential Vcc and second potential Vss, the drains of both transistors being connected together and to the cathode of a diode whose anode is connected to the second potential Vss, the gate of the first transistor being connected to the first input of the time-delay circuit, and the gate of the second transistor being connected to the second input of the time-delay circuit, the output of the time-delay circuit being connected to the common connection between the two transistors.

* * * * *